Patented Mar. 6, 1945

2,371,111

UNITED STATES PATENT OFFICE 2,371,111

PRODUCTION OF BIGUANIDES

Russell L. Sperry, Stamford, and Edwin O. Hook, Cos Cob, Conn., assignors to American Cyanamid Company, New York, N. Y., a corporation of Maine No Drawing. Application March 5, 1943, Serial No. 478,144

6 Claims. (Cl. 260—564)

The present invention relates to improvements in the production of biguanides, and more particularly to a method of preparing biguanide and alkyl substituted biguanides.

A known method of producing biguanide and alkyl substituted biguanides consists in passing hydrogen sulfide gas into an aqueous suspension of a copper complex salt of the biguanide, for example, copper biguanide sulfate

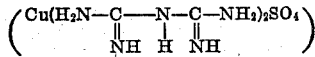

The precipitated copper sulfide is removed, and the solution of biguanide sulfate evaporated to dryness. The neutral biguanide sulfate

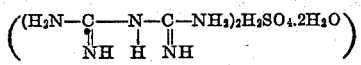

is dried for a period sufficient to remove the water of crystallization, and then suspended in methyl alcohol. Sodium methylate is added to the slurry, the precipitated sodium sulfate removed, and an alcohol solution of the free base obtained.

The present invention is based upon the discovery that biguanide and alkyl substituted biguanides can be produced in a simple and economical manner, by treating the corresponding copper biguanide sulfate in suspension in a lower aliphatic monohydric alcohol with an alkali metal sulfide. Thereafter, it is only necessary to remove the precipitated materials from the alcohol solution of the free biguanide.

In accordance with the invention, the copper biguanide sulfate in suspension in the alcohol is treated with a sufficient quantity of an alkali metal sulfide, e. g., sodium sulfide, to produce the following reaction:

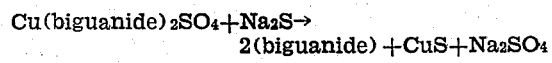

The mixture is agitated and warmed to complete the reaction, and then filtered to remove the precipitated copper sulfide and alkali metal sulfate. The filtrate containing the free biguanide may be used as such or concentrated, preferably under reduced pressure, to a small volume. Precipitation of the biguanide may be hastened by addition of ethyl ether.

For the purpose of this invention, an aliphatic monohydric alcohol of not more than four carbon atoms is preferred. Inasmuch as the solubility of the biguanides in such alcohols decreases as the molecular weights of the alcohols increase, there is a limit to the higher alcohols which can be advantageously used. In the process, it has been found desirable to warm the alcohol slurry to a temperature of 50 to 60° C., to assure complete reaction of the alkali metal sulfide with the copper complex salt. The alcohol and the amount thereof used should be such that at the end of the reaction, all of the biguanide remains in solution.

The alkali metal sulfides such as, for example, sodium sulfide and potassium sulfide, are particularly suitable in the process in contrast to the sulfides of barium, calcium, and aluminum, which are too insoluble in the alcohols to provide a sufficient sulfide ion concentration to precipitate the copper.

The following examples are given as specific embodiments, which further illustrate the invention, the parts being by weight:

Example I 36 parts of sodium sulfide (a commercial fused product—$Na_2S.3H_2O$) were added to a mixture consisting of 100 parts of copper biguanide sulfate and 320 parts of methyl alcohol. The reaction mixture was stirred and heated at 60° C., for one half hour, then cooled and filtered. The filter cake was washed with warm methyl alcohol, and the washings added to the filtrate. The alcohol solution was evaporated under vacuum to about one-third of the original volume, and the biguanide precipitated by addition of ethyl ether.

Example II

Example I was repeated, using, however, 380 parts of ethyl alcohol in place of the methyl alcohol. Warm ethyl alcohol was also used in washing the filter cake.

Similarly, the alkyl substituted biguanides, including both the symmetrical and unsymmetrical substituted compounds, such as, for example, ethyl biguanide, n-propyl biguanide, n-amyl biguanide, n-octyl biguanide, n-dodecyl biguanide, n-tetradecyl biguanide, n-octadecyl biguanide, diethyl biguanide, β-hydroxyethyl biguanide, di-n-butyl biguanide, di-n-hexyl biguanide, di-2-ethylhexyl biguanide, di-n-tetradecyl biguanide, unsymmetrical dimethyl biguanide, unsymmetrical di-n-propyl biguanide, unsymmetrical di-2-ethylhexyl biguanide, unsymmetrical di-n-dodecyl biguanide and unsymmetrical di-n-octadecyl biguanide, may be prepared from the corresponding copper biguanide sulfate.

Unlike the prior art method, the present invention offers the advantage of obtaining the free biguanide directly from the corresponding copper biguanide sulfate.

Alcohol solutions of the biguanides are of particular utility in the preparation of guanamines. For example, stearoguanamine is produced when an ester of stearic acid is added to a methyl alcohol solution of biguanide. Salts of the biguanide can be readily prepared by utilizing the alcohol solution of the free base.

While the invention has been described with particular reference to specific embodiments, it is to be understood that it is not to be limited thereto, but is to be construed broadly and restricted solely by the scope of the appended claims.

We claim:

1. A method of producing a member of the group consisting of biguanide and alkyl substituted biguanides which includes the steps of subjecting the corresponding copper biguanide sulfate in suspension in a lower aliphatic monohydric alcohol to the action of an alkali metal sulfide and removing the insolubles.

2. The method of claim 1 in which the alcohol contains not more than four carbon atoms.

3. The method of claim 1 in which the alkali metal sulfide is sodium sulfide.

4. A method of producing a member of the group consisting of biguanide and alkyl substituted biguanides which comprises reacting the corresponding copper biguanide sulfate with an alkali metal sulfide in the presence of an aliphatic monohydric alcohol containing not more than four carbon atoms, removing insoluble materials and recovering the biguanide from the alcohol solution.

5. The method of claim 4 in which the reaction is carried out at a temperature not exceeding about 60° C.

6. A method of producing biguanide which comprises reacting copper biguanide sulfate with sodium sulfide in the presence of methyl alcohol, removing insoluble materials and recovering biguanide from the methyl alcohol solution.

RUSSELL L. SPERRY.
EDWIN O. HOOK.